(12) United States Patent
Mihelic

(10) Patent No.: US 7,229,089 B2
(45) Date of Patent: Jun. 12, 2007

(54) FOLDING BICYCLE

(75) Inventor: Miko Mihelic, Dobrova (SI)

(73) Assignee: Studio Moderna SA, Lugano (CH)

( * ) Notice: Subject to any disclaimer, the term of this patent is extended or adjusted under 35 U.S.C. 154(b) by 0 days.

(21) Appl. No.: 10/461,017

(22) Filed: Jun. 12, 2003

(65) Prior Publication Data

US 2004/0056452 A1 Mar. 25, 2004

Related U.S. Application Data

(63) Continuation-in-part of application No. PCT/IB03/01243, filed on Mar. 3, 2003.

(51) Int. Cl.
*B62K 15/00* (2006.01)

(52) U.S. Cl. .................. 280/278; 280/279; 280/287

(58) Field of Classification Search ............... 280/278, 280/287, 274, 276, 281.1, 279, 288, 231
See application file for complete search history.

(56) References Cited

U.S. PATENT DOCUMENTS

| 551,848 A | * | 12/1895 | Bryany et al. | ............. | 280/7.16 |
| 599,859 A | * | 3/1898 | McFadden | ................. | 280/7.16 |
| 625,612 A | | 5/1899 | Sternberg | | |
| 645,145 A | * | 3/1900 | Trebert | ....................... | 280/278 |
| 2,280,932 A | * | 4/1942 | Swanson | .................... | 301/2.5 |
| 3,680,879 A | | 8/1972 | Cogliano | | |
| 4,002,351 A | * | 1/1977 | Zuck | .......................... | 280/278 |
| 4,029,326 A | * | 6/1977 | Blow, Jr. | ................... | 280/7.16 |
| 4,067,589 A | | 1/1978 | Hon | | |
| 4,438,942 A | | 3/1984 | Hon | | |
| 4,441,729 A | * | 4/1984 | Underwood | ................ | 280/278 |
| 4,448,435 A | | 5/1984 | Hon | | |

(Continued)

FOREIGN PATENT DOCUMENTS

BE 628783 A 6/1963

(Continued)

OTHER PUBLICATIONS

Compiled by Steven M. Scharf, "Folding Bicycle Information," website, last updated: Aug. 15, 2002.

(Continued)

*Primary Examiner*—Anne Marie Boehler
(74) *Attorney, Agent, or Firm*—Mitchell P. Brook, Esq.; Luce, Forward, Hamilton & Scripps LLP

(57) ABSTRACT

A foldable bicycle is provided. One feature of the foldable bicycle is that the central portion of the frame that defines the bicycle's geometry is substantially rigid. That is, the down tube, seat tube, top tube and bearing tube are substantially fixed relative to each other. Another feature of the foldable bicycle is that the front wheel can be folded into a position between the down tube, which is comprised of two tubes. Yet another feature is a tandem bicycle configuration that does not extend the length of the frame or the wheelbase. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

15 Claims, 15 Drawing Sheets

U.S. PATENT DOCUMENTS

| | | | |
|---|---|---|---|
| 4,460,191 A | | 7/1984 | Ishibashi et al. |
| 4,491,337 A | * | 1/1985 | Zuck .......................... 280/278 |
| 4,598,923 A | | 7/1986 | Csizmadia |
| 4,718,688 A | | 1/1988 | Sanders |
| 4,936,597 A | * | 6/1990 | Hartmann ................... 280/231 |
| 4,995,626 A | * | 2/1991 | Montague ................... 280/231 |
| 5,125,678 A | * | 6/1992 | Bogen ........................ 280/278 |
| 5,135,246 A | | 8/1992 | Montague |
| 5,873,590 A | | 2/1999 | Abe et al. |
| 6,139,038 A | * | 10/2000 | Santa Cruz et al. ........ 280/278 |
| 6,279,935 B1 | * | 8/2001 | Wagner ....................... 280/287 |
| 6,347,803 B1 | | 2/2002 | Berges |
| 6,394,478 B1 | | 5/2002 | Balajadia |
| 6,612,597 B2 | * | 9/2003 | Baker et al. ................. 280/204 |
| 6,641,159 B1 | * | 11/2003 | Fan .............................. 280/278 |
| 2003/0057672 A1 | * | 3/2003 | Baker et al. ................. 280/231 |

FOREIGN PATENT DOCUMENTS

| | | | |
|---|---|---|---|
| CH | 677215 A5 | | 4/1991 |
| DE | 3234183 | * | 3/1984 |
| DE | 43 13 832 A | | 11/1994 |
| DE | 100 32 105 A1 | | 1/2001 |
| DE | 102 40 194 A1 | | 3/2003 |
| DE | 203 00 031 A1 | | 3/2003 |
| EP | 0 026 800 B1 | | 4/1981 |
| EP | 0 565 760 A1 | | 10/1993 |
| EP | 0 965 517 A2 | | 5/1999 |
| EP | 1 069 036 B2 | | 1/2001 |
| FR | 1 011 990 A | | 7/1952 |
| FR | 2664228 A1 | | 1/1992 |
| FR | 2827829 | | 1/2003 |
| GB | 526773 A | | 9/1940 |
| GB | 2144687 A | | 3/1985 |
| GB | 2289874 | | 12/1995 |
| GB | 2296224 A | | 6/1996 |
| GB | 2377207 A | | 7/2001 |
| GB | 2373770 | * | 10/2002 |
| GB | 2373770 A | | 10/2002 |
| JP | 28-000167 | | 1/1953 |
| JP | 44-106976 | | 7/1969 |
| JP | 49-023395 | | 6/1974 |
| JP | 56-022182 | | 2/1981 |
| JP | 57-151480 | | 9/1982 |
| JP | 62-026980 | | 3/1987 |
| JP | 02-262485 | | 10/1990 |
| JP | 08-133160 A | | 5/1996 |
| JP | 08-198167 A | | 8/1996 |
| JP | 09-207858 A | | 8/1997 |
| JP | 10-119866 A | | 5/1998 |
| JP | 10-152085 A | | 6/1998 |
| JP | 11-005582 A | | 1/1999 |
| JP | 2000-062672 | | 2/2000 |
| JP | 2000-062672 A | | 2/2000 |
| TW | 220236 | | 2/1994 |
| WO | WO 99 38759 A | | 8/1999 |
| WO | WO 00/05128 A1 | | 2/2000 |
| WO | 01/38165 | * | 5/2001 |
| WO | WO 01 38165 A | | 5/2001 |
| WO | WO 2004/024546 A1 | | 3/2004 |

OTHER PUBLICATIONS

Brompton Bicycle Ltd., "The Choice of Bikes", www.bromptonbicycle.co.uk, Dec. 31, 2002 or earlier, (6 pages).

Green Gear Cycling Inc., "Bike Friday Performance that Packs", www.greangear.com, Dec. 31, 2002 or earlier, (1 page).

Strida Folding Bicycles, "Leading Edge Design", www.strida.com/folding_bicycle.html, Dec. 31, 2002 or earlier, (1 page).

Dahon, "Folding Bikes", www.dahon.com, Dec. 31, 2002 or earlier, (5 pages).

Monatgue Corporation, "Full Size High Performance Bicycles that Fold", www.montagueco.com/message.html, Dec. 31, 2002 or earlier, (1 page).

* cited by examiner

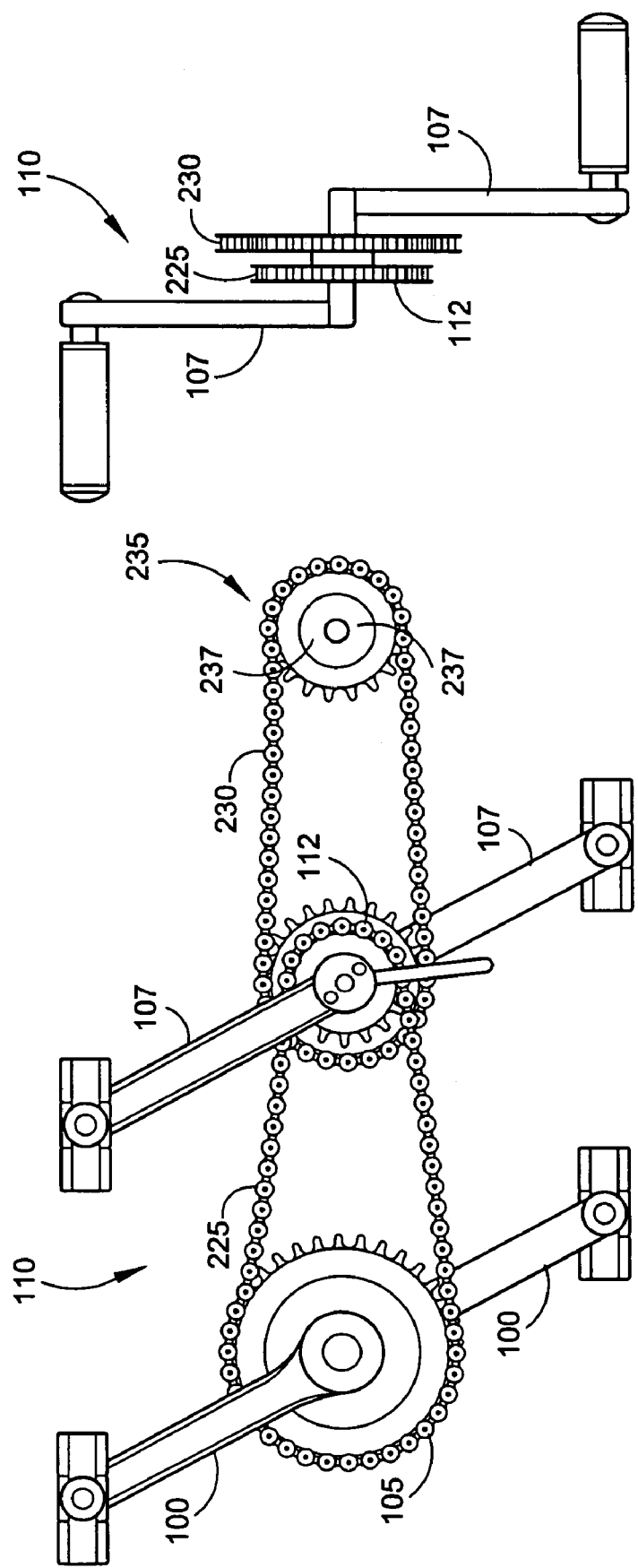

FOLDING BICYCLE

This application is a continuation-in-part of co-pending PCT International Patent Application No. PCT/IB03/01243, filed on Mar. 3, 2003, and entitled, "Folding Bicycle", which is incorporated herein by reference.

FIELD OF THE INVENTION

The present invention generally relates to folding bicycles that can be folded into a relatively compact arrangement, and unfolded for riding.

BACKGROUND OF THE INVENTION

Bicycles that can be folded have an advantage of a relatively compact arrangement for storage or transport, making them popular with users wishing to reduce storage space, such as commuters, recreation enthusiasts, and campers, among others. Known folding bicycles have a myriad of shortcomings when compared with standard non-folding bicycles. For example, known folding bicycles have a frame of two or more pieces, which can be dismantled, folded or telescopically shortened. In some known folding bicycles, the folded dimensions can be further reduced via removal of their wheels.

In some conventional bicycle folding joints are situated in the central area of the frame, such as within one or more of the down tube, top tube, seat tube and head tube, or bearing tube. A disadvantage of such an arrangement is that the frame's rigidity is reduced, which can detrimentally affect pedaling efficiency, and overall stability.

Another disadvantage associated with such known folding bicycles is that the joints that enable folding can develop a gap, or "play" over a period of usage. This play results in a bicycle that flexes, reducing pedaling efficiency, as the force applied to propel the bicycle is partially absorbed by the flexing joints. In addition, the joints themselves can be weak points in the bicycle, and can cause structural failure, instability or other undesirable riding characteristics.

A further disadvantage is that known folding bicycles have frames that frequently are smaller than the frames of a comparable standard non-folding bicycle. This reduces the ergonomic suitability for a rider. A result of this for many riders is a decrease of the distance that can be ridden with comfort. Riding discomfort can decrease pedaling efficiency, and decrease riding characteristics are less favorable due to the different position of front wheel and smaller wheel size compared to the non-folding bicycles.

Therefore, there exists a need for a folding bicycle that is ergonomically comfortable when riding, optionally has a unitary central frame structure, optionally can be readily folded into a compact arrangement, and/or optionally can maintain its structural rigidity and integrity despite repeated folding and unfolding.

SUMMARY OF THE INVENTION

The present invention alleviates to a great extent the disadvantages of known folding bicycles, some of which are discussed above, by providing a bicycle that is foldable into a compact size, while still having a central frame without any folding joints. The foldable bicycle of the present invention, preferably is foldable while generally providing a riding experience and durability of a standard non-folding bicycle.

One embodiment of the present invention includes a central frame assembly of a down tube, a seat tube, a top tube and a bearing tube, wherein the down tube, seat tube, top tube and bearing tube are substantially fixed relative to each other. This arrangement can promote ergonomic riding characteristics of a non-folding bicycle.

The foldable elements of present invention optionally include a foldable front fork assembly, a foldable rear-wheel assembly and a foldable handlebar assembly. Although each of these assemblies are optional features of the present invention, they operate together to reduce the folded size of the foldable bicycle, rendering it for example more easily transportable. The optional front-fork assembly mounts the front wheel on its lower end, and is jointed at or near a connector strut. In operation, the front fork assembly includes linking bars connecting the upper end at the frame with the wheel, at its axle. The joint can be operated to unlock and allow the front fork assembly to rotate about the joint, in the direction of the down tube assembly of the frame. The down tube of the frame preferably has two spatially separated portions spaced apart from one another. So, when the front fork assembly is rotated about the joint, the wheel can fold into the area between the separated portions, thereby rotating into the center of the frame, through the two spaced apart portions of the down tube. Alternatively, the wheel and front fork assembly can be rotated 180° prior to being folded about the joint.

The optional handlebar assembly also serves to reduce the folded dimension of the foldable bicycle. In particular, the handlebars are mounted to a tube in a locked, but unlockable fashion. When it is desired to fold the bicycle, the handlebars are unlocked, and rotated downwards, preferably to a position that is within the area of the central portion of the frame. In a preferred embodiment, the handlebars are fully turned 180° prior to folding, and the handlebars are then unlocked and rotated downwards to a position in which one handle grip is on the left side of the central portion of the frame, and another handle grip is on the right side of the central portion of the frame. Then, using a lockable joint, the respective handlebars can be folded inwards towards each other, and can be folded inwards a sufficient amount so that the handle grips cross one another.

The optional rear wheel assembly also serves to further reduce the folded dimension of the foldable bicycle. In this embodiment, a strut assembly descends at an angle from beneath the seat to the rear wheel axle. Preferably the strut assembly includes spatially separated, or parallel, bars, between which the rear wheel is mounted. At a location between the seat and the rear wheel axle, the strut assembly includes a locking assembly. When the locking assembly is released, the rear wheel rotates upwards, between the spatially separated bars of the strut assembly. In a preferred embodiment, the compactness of this arrangement can be enhanced by using dual transmission chains, with an intermediate sprocket. The chain stays, together with the rear wheel, are foldable upwards toward the seat. To facilitate the folding of the chain stays and the rear wheel, the transmission from the chainring to the sprocket is complemented by two sprockets and a shaft, i.e. consists two chains in series, which results in an additional transmission ratio. The shaft also serves as a pivot, around which the chain stays and the rear wheel fold. The front chain remains between the front chainring and the intermediate sprocket, on the shaft, while the rear chain remains between the intermediate sprocket and the rear sprocket, and shifts upwards together with the chain stays and the rear wheel without changing the distance between the front sprocket and the rear sprocket. In this embodiment, the rear wheel is rotated about the intermediate sprocket when folding the wheel upwards. The chain stays, together with the rear wheel, is foldable upwards toward the seat. In riding position, power is transmitted via a chain from a pedal sprocket to the intermediate sprocket and then via a second chain from the intermediate sprocket to a rear wheel sprocket mounted at the rear wheel axle. If the rear wheel is removed, the length of the bicycle can be further reduced in the folded position.

To reduce the width of the folded bicycle, the pedals can also be folded.

In an alternate embodiment of the present invention, a foldable tandem bicycle is provided. In this arrangement, a second seat is situated behind the front seat, and a second set of pedals is provided. In the tandem arrangement, a second set of pedals is not necessarily required. For example, footrests can be added at any suitable position for receiving a second passenger's feet, but preferably in a location safely away from operative components or the first pedals. In addition, as an alternative to the second seat, or in addition to the second seat, other optional components can be added, such as a child seat, basket, briefcase holder, rack, etc. Such components can be attached in a similar fashion and location as the second seat.

In a further embodiment, the bicycle can be equipped with a motor providing torque at one of the sprockets or the chainring.

These and other features and advantages of the present invention will be appreciated from review of the following detailed description of the invention, along with the accompanying figures in which like reference numerals refer to like parts throughout.

BRIEF DESCRIPTION OF THE DRAWINGS

FIG. 11 is a detail view of a sprocket arrangement of the foldable bicycle in accordance with the present invention;

FIG. 12 is a cross-sectional detail view of a sprocket arrangement of the foldable bicycle in accordance with the present invention as shown in FIG. 11;

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention relates to a foldable bicycle including a frame geometry providing various components in the same relation to one another both in the folded and unfolded conditions. As defined herein "frame geometry" refers to the arrangement of tubes that make up the bicycle frame. The relationship between the tubes comprising the bicycle frame creates a specific overall "frame geometry." One feature of the foldable bicycle of the present invention is that the frame core preferably is of a unitary construction, i.e. containing no joints connecting moving parts.

Figure 1:
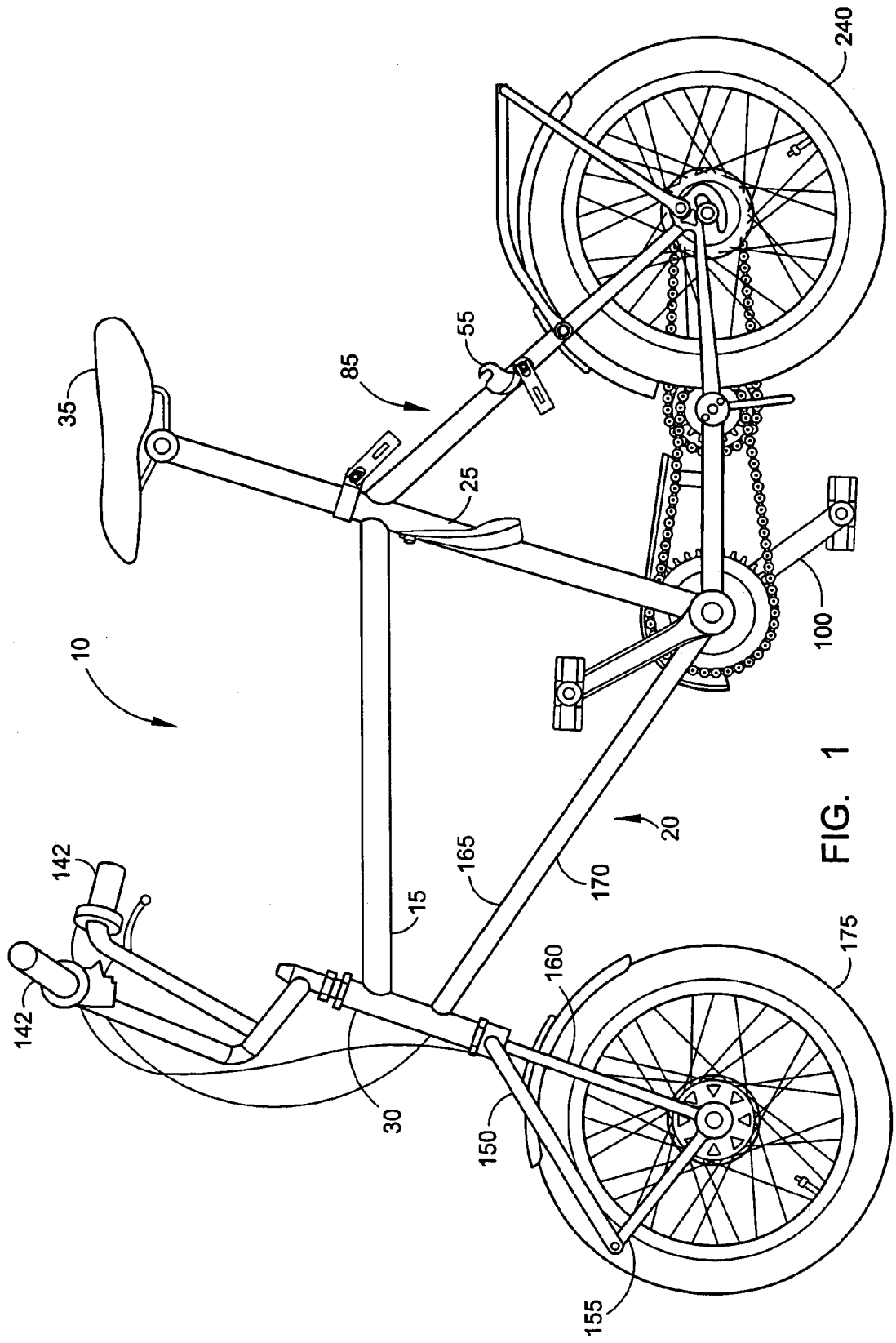
FIG. 1 is a side view of an embodiment of a foldable bicycle in accordance with the present invention.
Figure 13:
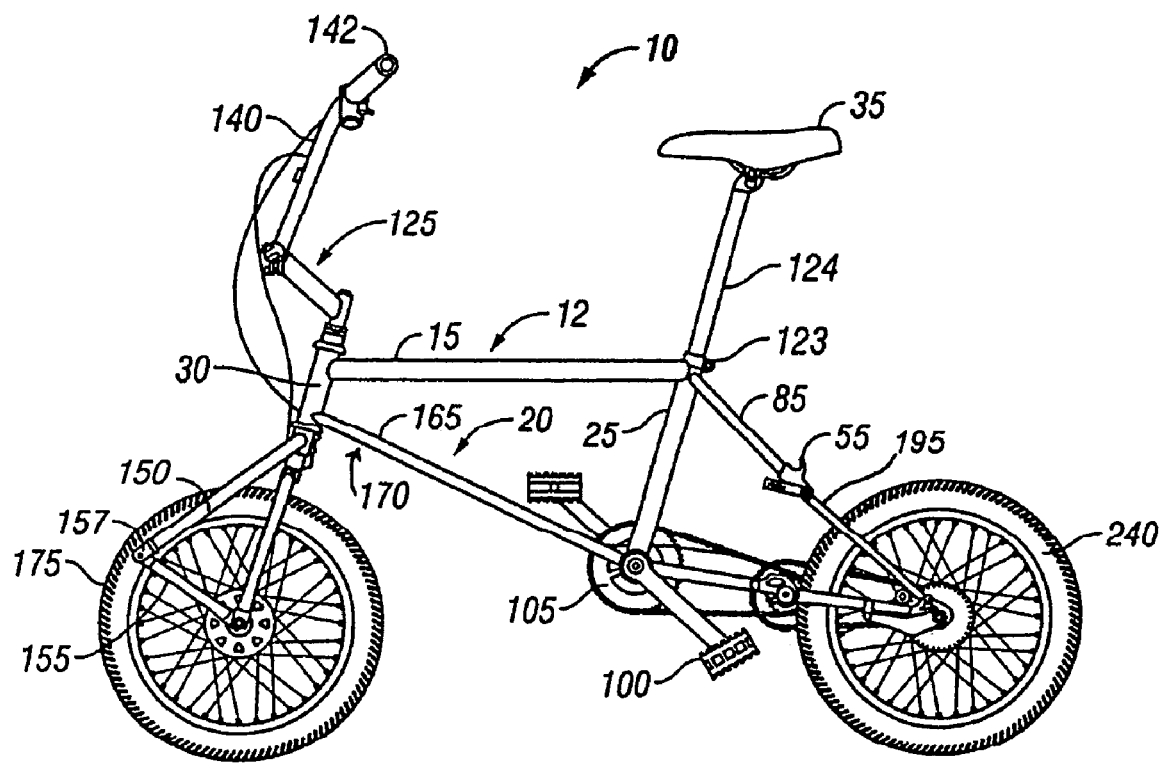
FIG. 13 is a side view of an embodiment of a foldable bicycle in accordance with the present invention.
Figure 15:
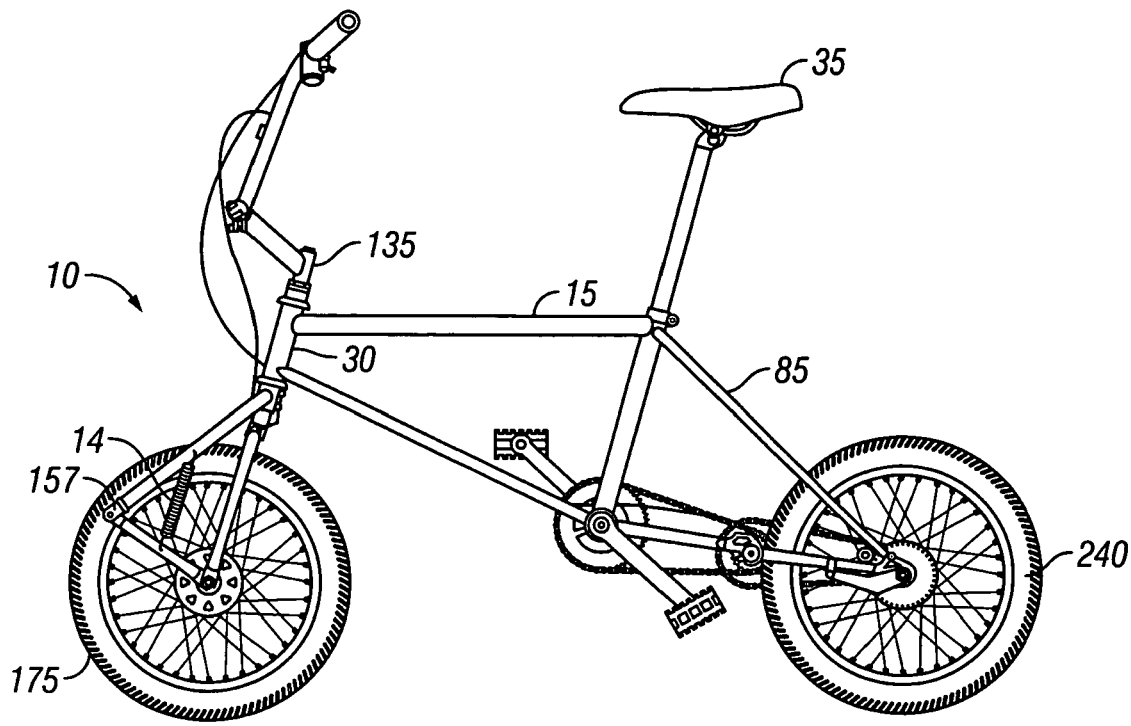
FIG. 15 is a side view of an embodiment of a foldable bicycle in accordance with the present invention.

Referring to FIGS. 1, 13 and 15, one embodiment of a foldable bicycle 10 of the present invention is illustrated. This embodiment of the present invention comprises a core frame assembly 12 including a single down tube 20 or preferably including spatially separated down tubes 165, 170, a seat tube 25, a top tube 15 and a bearing tube 30, wherein the down tube 20, seat tube 25, top tube 15 and bearing tube 30 are in substantially fixed relation to each other. The downtubes 165, 170 preferably have a gap between them, which is approximately the same width as the front wheel 175, or slightly wider. The downtubes 165, 170 can be parallel to one another, angled, or curved. Alternatively, a single downtube having a curve is provided, or a single tube, split in the middle is provided, also shaped to accommodate the front wheel when it is folded upwards.

Figure 2:
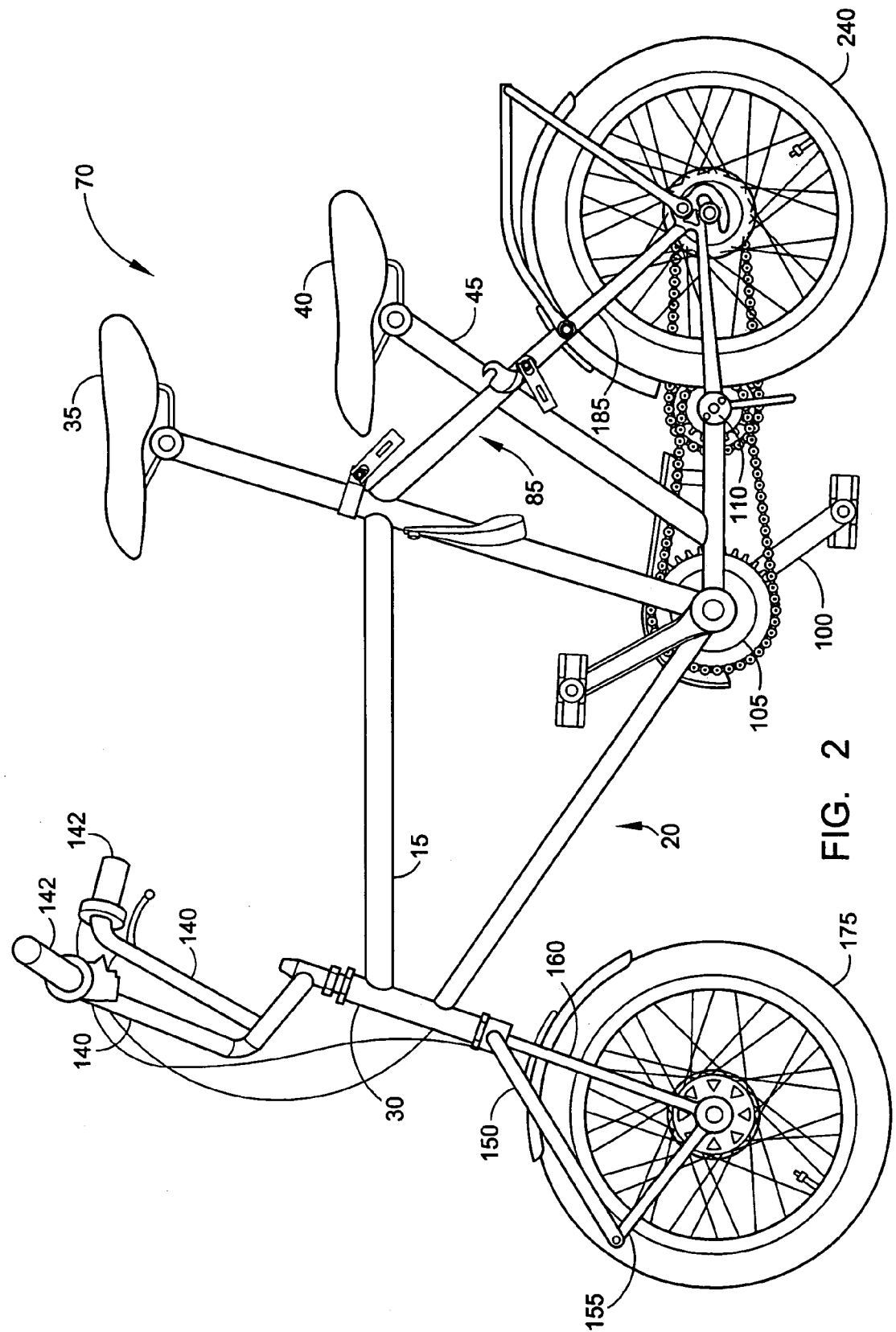
FIG. 2 is a side view of a second embodiment of the foldable bicycle in accordance with the present invention, namely a tandem foldable bicycle.
Figure 3:
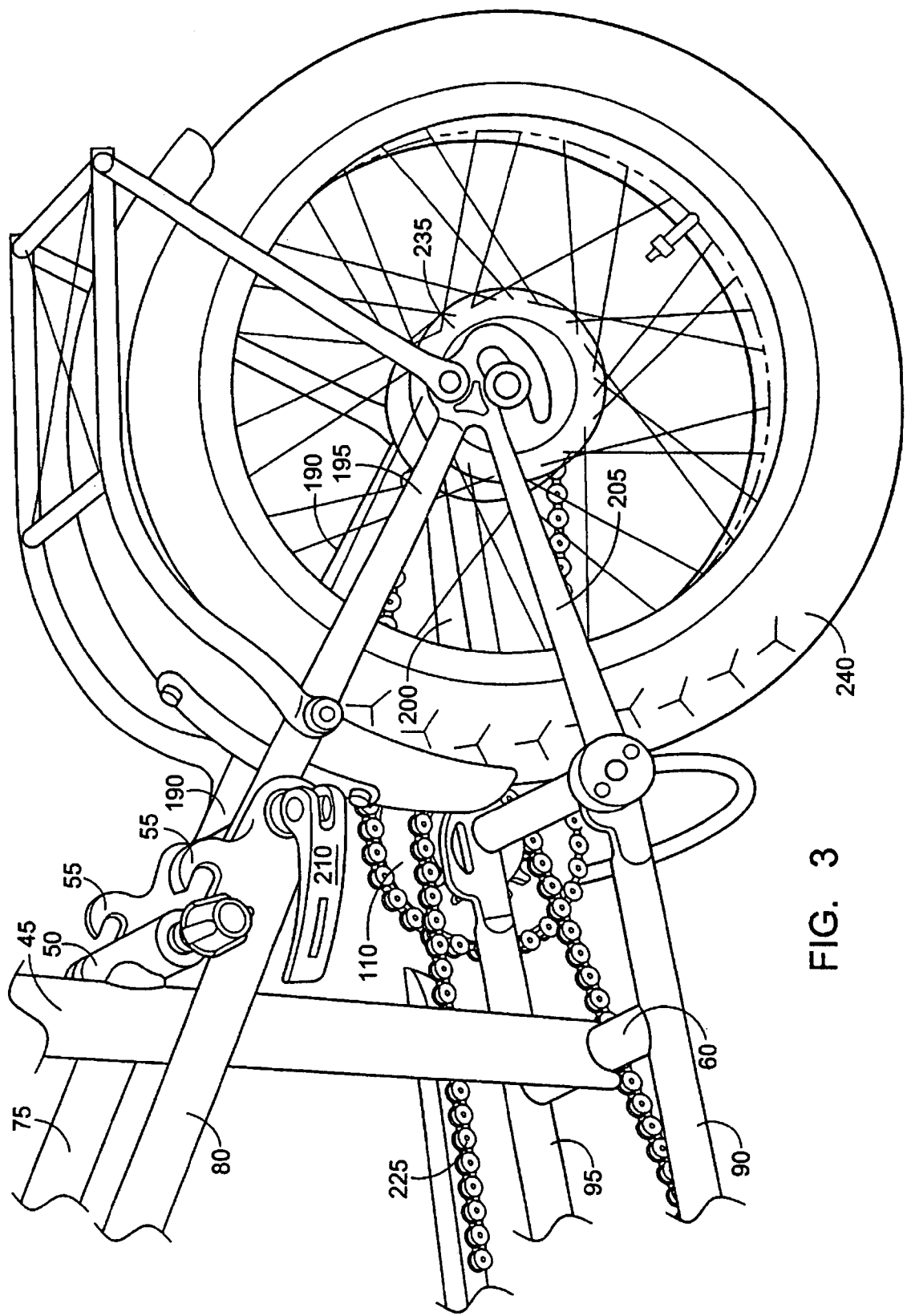
FIG. 3 is a detail view of the embodiment illustrated in FIG. 2, showing a second seat tube, in accordance with the present invention.
Figure 18:
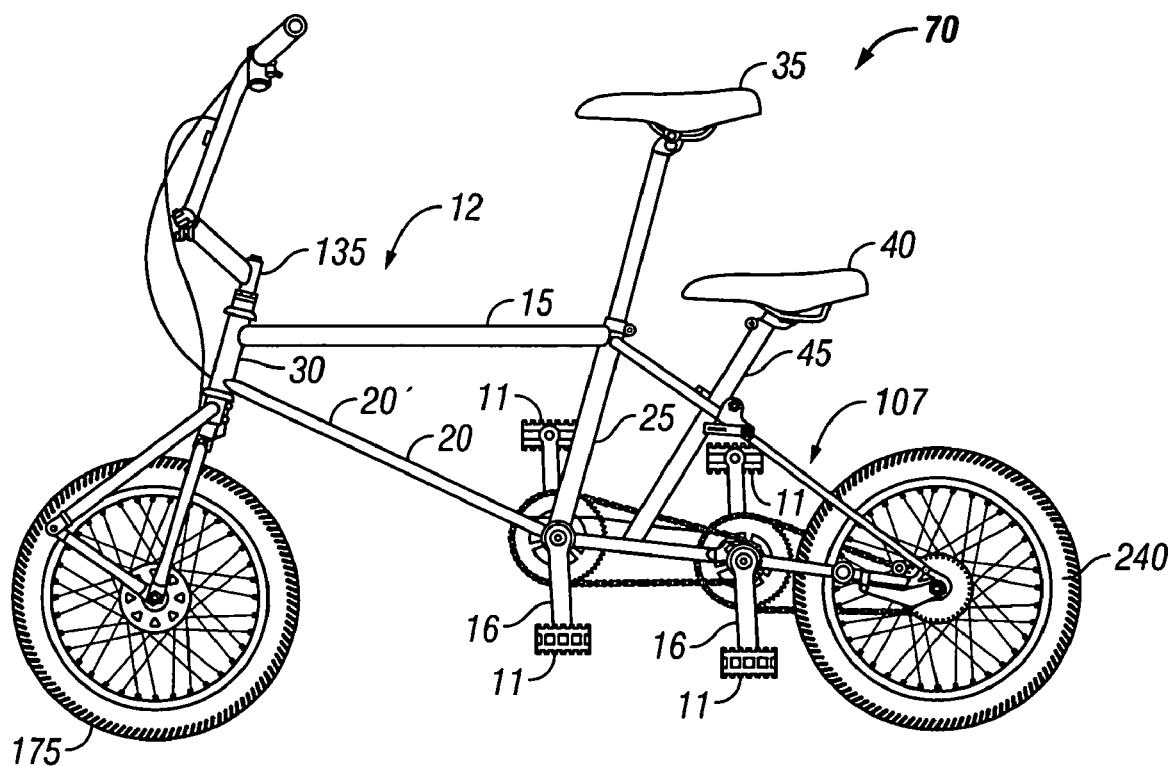
FIG. 18 is a side view of a tandem foldable bicycle in accordance with the present invention.

A second embodiment of the present invention is illustrated in FIGS. 2 and 18. In this embodiment, a tandem foldable bicycle 70 is provided. This embodiment includes various features found in the single seat embodiment 10, including the core frame assembly of a down tube 20 or spatially separated downtubes 165, 170, a seat tube 25, a top tube 15 and a bearing tube 30, wherein the down tubes 165, 170, seat tube 25, top tube 15 and bearing tube 30 are substantially fixed relative to each other. Referring to FIGS. 2, 3 and 18, the tandem foldable bicycle 70 includes a second seat tube 45 with a second seat 40 and a second seat tube fastener 50. Preferably, the second seat tube fastener 50 is a quick-release fastener, but other types of fasteners may be employed, such as latches, locks, and suitable nut-and-bolt arrangements.

Optionally, a single seat bicycle can be converted to a tandem folding bicycle, by positioning the second seat tube 45 between the two upper seat stay tubes 75, 80 that comprise the upper seat stay 85. Attached to the upper seat stay 85 is the second seat tube fastener receiver 55, which is sized to receive the second seat tube fastener 50. The bottom end of the second seat tube 45 is positioned against the second seat tube support 60, located between the two forward bottom bracket tubes (i.e. chain stays) 90, 95, shown in FIG. 3. In this fashion, the foldable bicycle 10 can be converted into a tandem foldable bicycle 70 without changing the frame dimensions, or the bicycle wheelbase.

Referring now to FIG. 18, the tandem foldable bicycle 70 optionally may include a second pedal assembly 107 that is coupled with middle sprocket assembly 110. As depicted in FIGS. 11 and 18, preferably the second pedal assembly 107 is aligned in the same angular position as the first pedal assembly 100. Alternatively, a pair of footrests (not shown) may be mounted anywhere on the frame where appropriate, safe and convenient, such as on the two forward bracket tubes (i.e. chain stays) 90, 95.

In a further embodiment of the tandem bicycle, the second seat 40 is positioned so that a passenger in the seat 40 can face backwards. Optional footrests may be provided to allow a comfortable resting place for the rear-facing passenger's seat. Likewise the seat 40, whether front or rear facing may include amenities such as a backrest enhancing passenger comfort.

Figure 4:
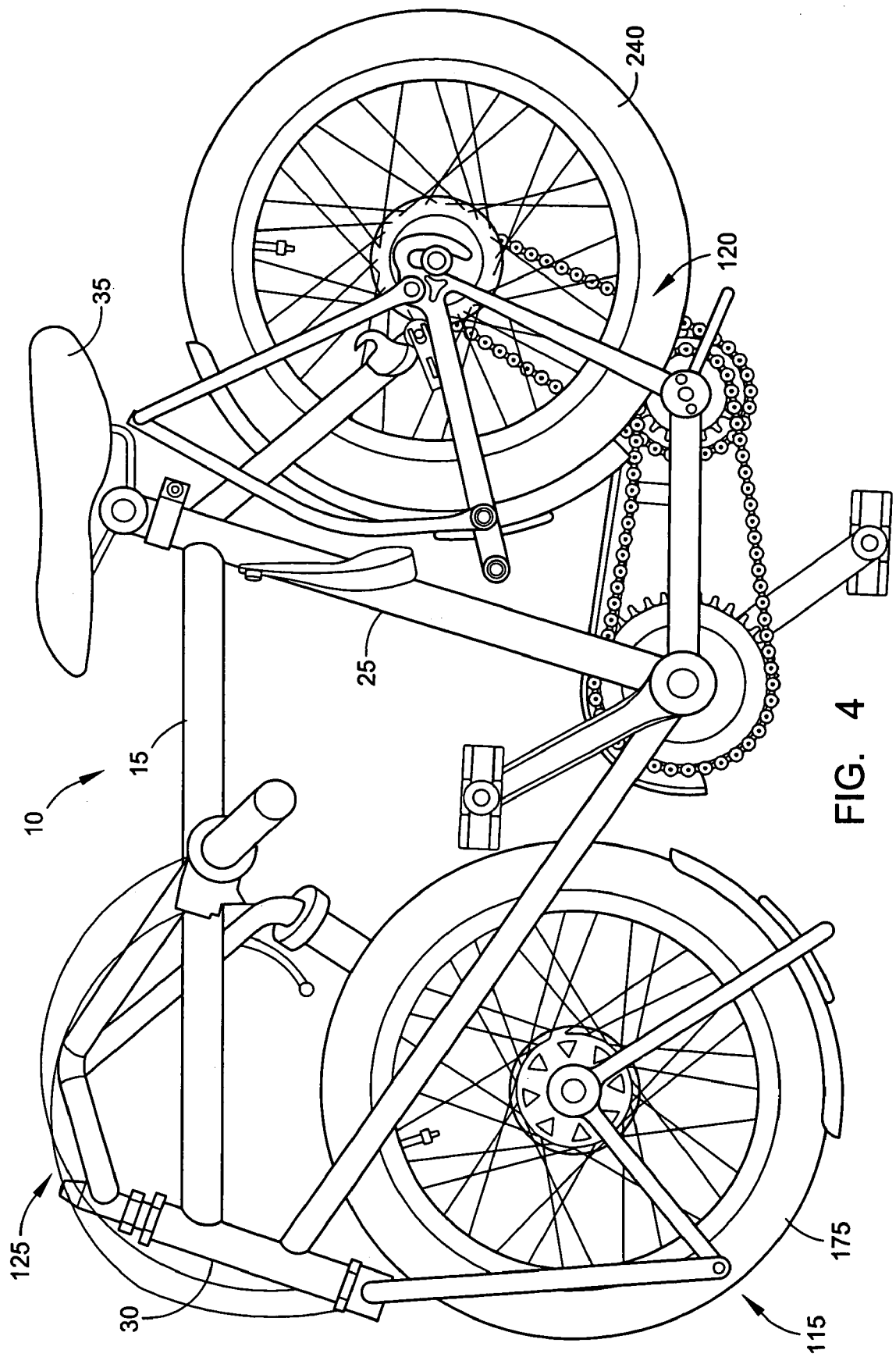
FIG. 4 is a side view of the embodiment illustrated in FIG. 1, illustrating the foldable bicycle in accordance with the present invention in a folded configuration.
Figure 14:
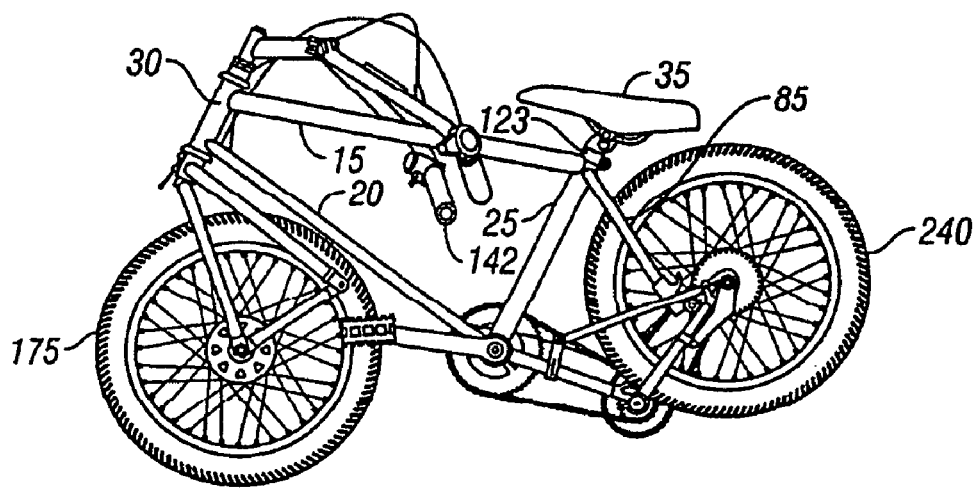
FIG. 14 is a side view of the embodiment illustrated in FIG. 13, illustrating the foldable bicycle in accordance with the present invention in a partially folded configuration.

Referring to FIGS. 4 and 14, the foldable bicycle 10 of the present invention is illustrated in a folded configuration. Various optional folding features are illustrated in the figures. In the illustrated embodiment in FIGS. 1, 4, 13 and 15, the optional folding elements include foldable front-fork assembly 115, a foldable rear-wheel assembly 120 and a foldable handlebar assembly 125. In addition, the seat 35 optionally can be retracted into the seat tube 25 by releasing seat lock 123 enabling the seat mounting tube 124 to be slid into the seat tube 25. So, preferably, the seat mounting tube 124 has a smaller diameter than that of seat tube 25, enabling the seat mounting tube 124 to move within seat tube 25.

Figure 5:
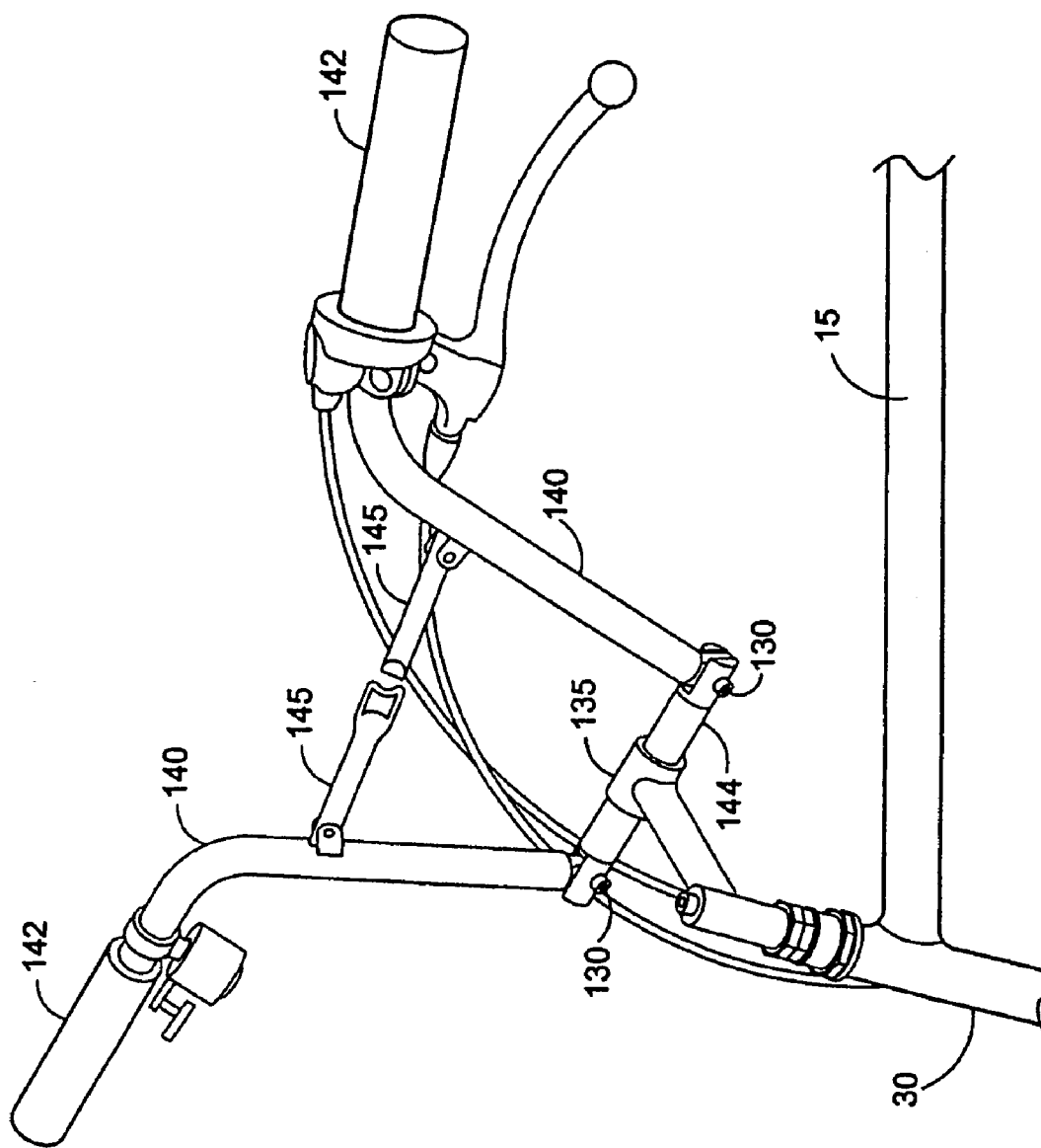
FIG. 5 is a detail view of the embodiment illustrated in FIG. 2, showing the foldable handlebar assembly, in accordance with the present invention.
Figure 6:
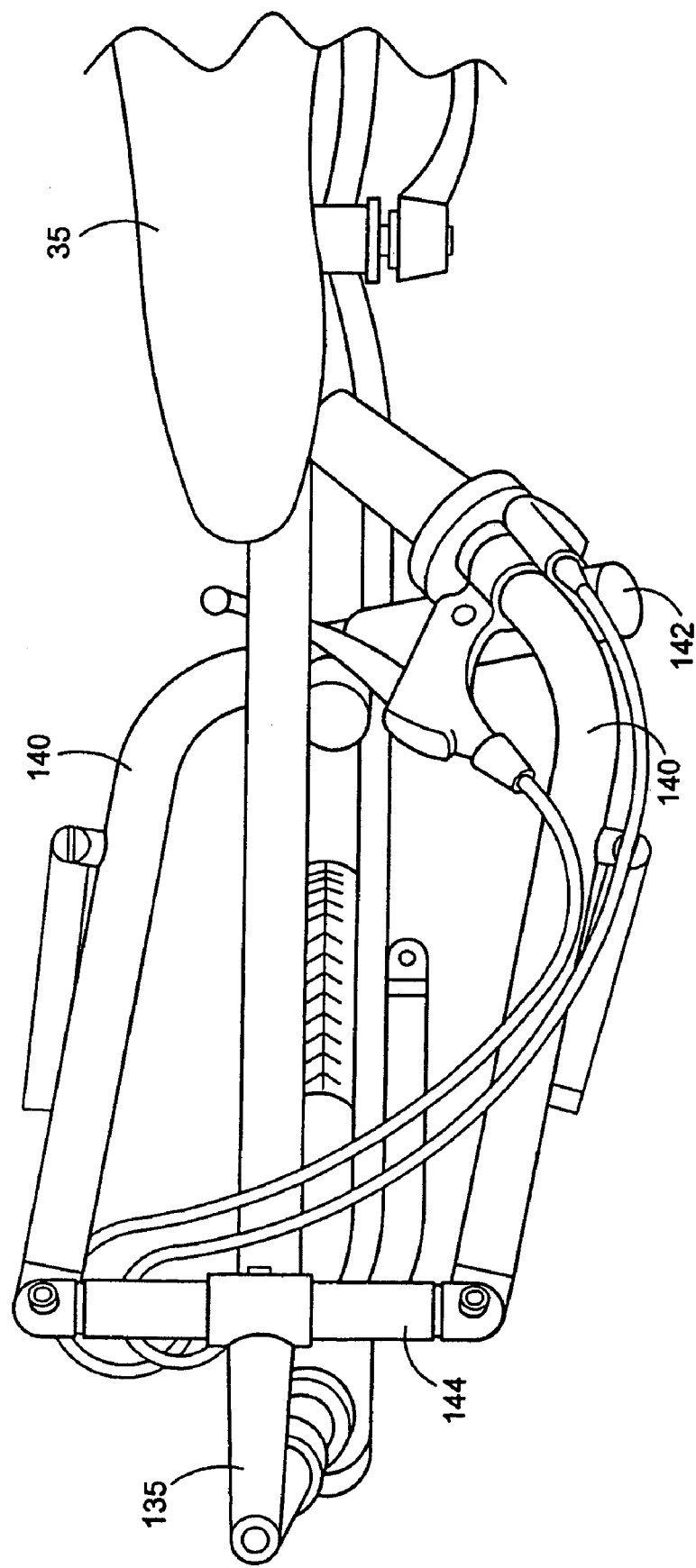
FIG. 6 is a detail view of the embodiment illustrated in FIG. 5, showing the foldable handlebar assembly in a folded configuration, in accordance with the present invention.

As shown in FIGS. 5 and 6, the foldable handlebar assembly 125 comprises a mounting member 135, also called a gooseneck, that is rotatably coupled with the bearing tube 30 (also called a head tube). The handlebars 140 are mounted to the mounting member 135 about handlebar pivot axes 130. Preferably the handlebars 140 can be rotated from an upright position as illustrated in FIGS. 1, 2 and 5 for example, to a folded downwards position as illustrated in FIGS. 3, 4 and 6. Any mechanism can be used that enables the handlebars 140 to be upright in a riding position and sufficiently fixed so as to allow safe steering, and then releasable and rotated downwards in a folded configuration of the bicycle 10, 70. In one embodiment, there is a friction fit between the handlebar tube 144 and the mounting member 135, which is suitably shaped to receive the handlebar tube 144. In another embodiment, a latching mechanism is provided, and in another a ratchet mechanism is provided. The handlebar elements 140, can include tubing, and at their respective ends, handles 142.

In one embodiment, the respective handlebar elements 140 can be folded inwards as well, in order to further decrease the folded size of the bicycle. In this embodiment, handlebar pivot axes 130 are provided at the intersection of the handlebars 140 and the mounting member 135. One embodiment handlebar latch 145, that releases the handlebar elements 140, is a hook-and-loop type, but other type of latches may be employed, such as a quick-release latch, or any other type of suitable latch or fastener.

Figure 7:
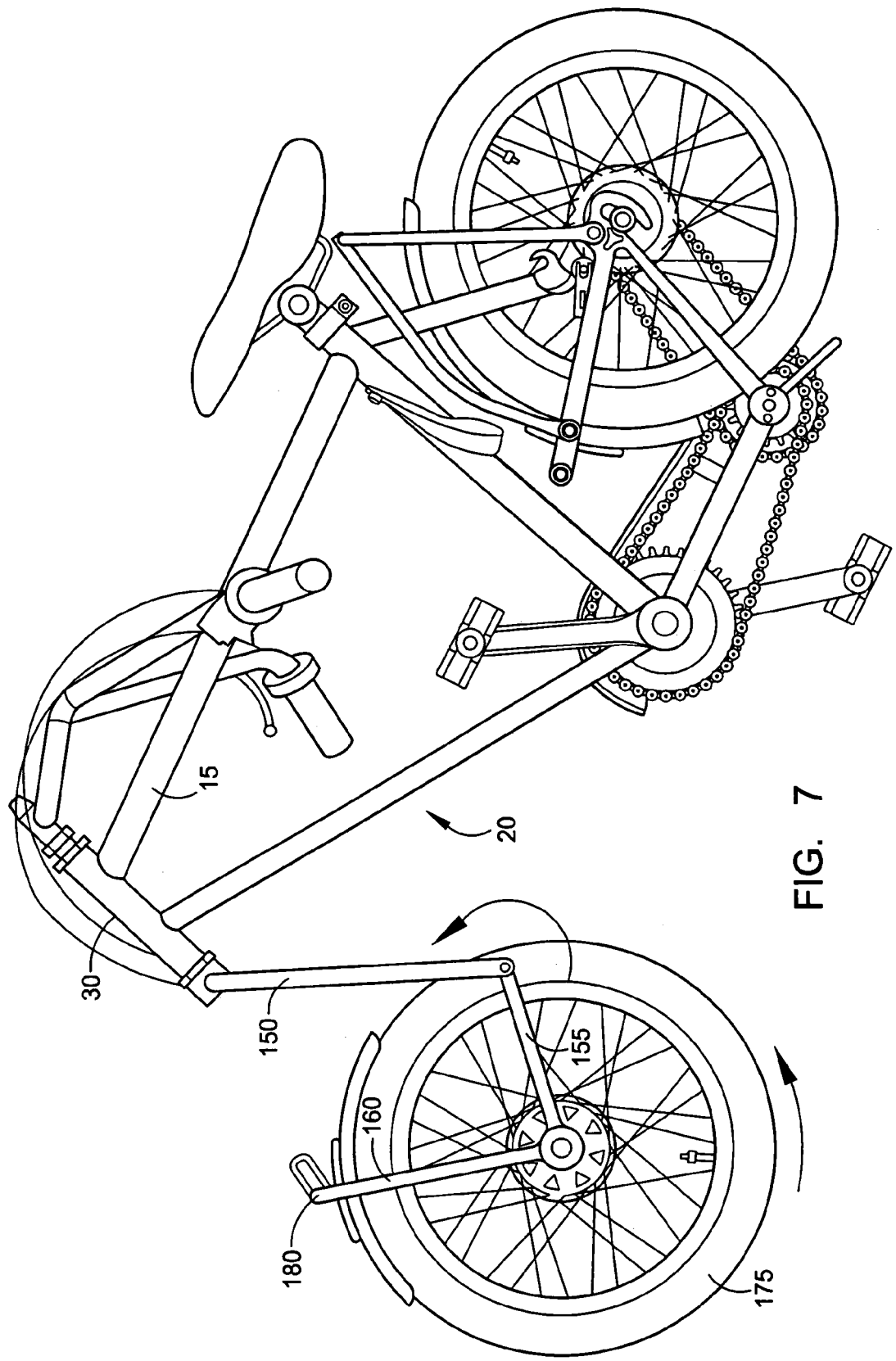
FIG. 7 is a detail view of the embodiment illustrated in FIG. 2, showing the foldable front fork assembly in a partially-folded configuration, in accordance with the present invention.
Figure 8:
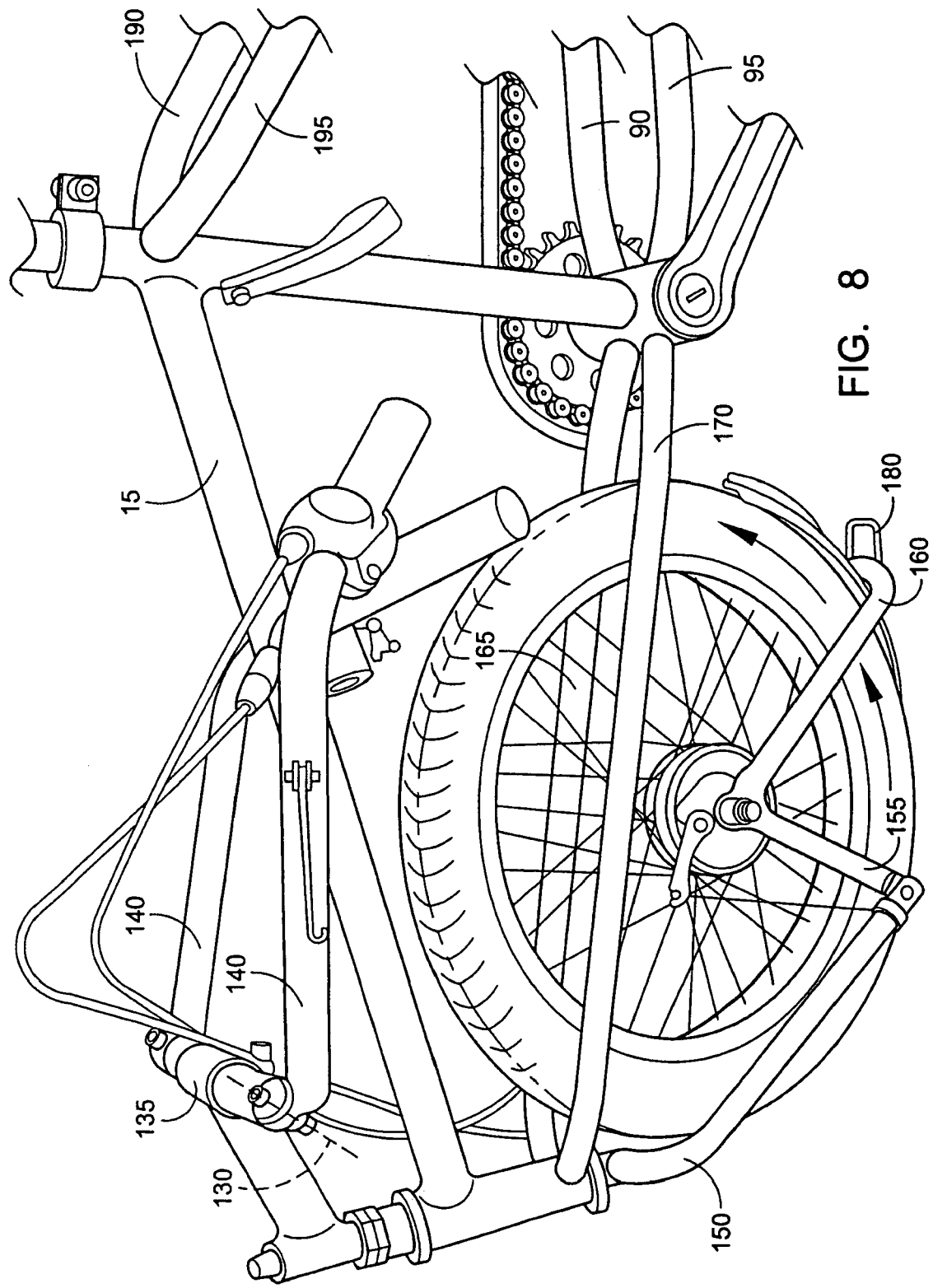
FIG. 8 is a detail view of the embodiment illustrated in FIG. 7, showing the front fork assembly in a completely folded configuration, in accordance with the present invention.

Referring now to FIGS. 6, 7 and 8, a preferred method of folding the handlebar assembly 125 will now be described. Preferably, the entire handlebar assembly 125 (along with the front wheel 175) is rotated around approximately 180 degrees so that the entire assembly is in a backwards orientation. In order to achieve this rotation, the mounting member 135 is rotated as desired within the bearing tube 30. This rotating force is transmitted to the front wheel 175 via its associated mounting elements. After this initial rotation, then the handlebar latch 145 is released allowing each handlebar tube 140, along with its associated elements, to be rotated about their own handlebar pivot axes 130. In one embodiment of the present invention, one handlebar pivot axis 130 is angled at 45 degrees and the other handlebar pivot axis 130 is angled at 35 degrees so that the handles 142 mounted at the ends of the handlebar tubes 140 do not contact each other when in the folded position underneath the top tube 15, as shown in FIGS. 6 and 8.

Referring again to FIGS. 7 and 8, the front fork assembly 115 is illustrated. In a riding configuration as illustrated in FIG. 1, the front fork assembly 115 mounts the front wheel 175 via an axle to the frame 12. It should be recognized that any arrangement of elements of the front fork assembly 115 can be used that rotatably mounts the front wheel 175, and optionally allows the front wheel to be moved towards the frame 12 in a folding operation. In the illustrated embodiment, the front fork assembly 115 is pivotally attached to the bearing tube 30 of the frame 12. It includes a front fork 150 that extends forward when the foldable bicycle 10 is arranged in a riding configuration, as shown in FIG. 1. Pivotally attached to the front fork 150, about fork pivot axis 157 is a swing arm 155 that has a front wheel 175 removeably and rotatably coupled thereto. Fixedly attached to the swing arm 155 is a stirrup 160 that includes a stirrup latch 180. Both the swing arm 155 and the stirrup 160 are positioned about the front wheel 175.

In a preferred embodiment the stirrup latch 180 is a spring lock, but other types of latches and fasteners, such as hook-and-loop, or quick-release fasteners may be employed. The front fork assembly 115 is folded by rotating the front fork 150 approximately 180 degrees. The stirrup latch 180 is then released, freeing the stirrup 160, and allowing the rider to rotate the swing arm 155 and stirrup 160 about the fork pivot axis 157, as shown in FIGS. 7 and 8.

Examples of folded configurations are illustrated in FIGS. 4 and 8. In a folded configuration, the front wheel 175 is moved towards the frame. Preferably it is positioned between the two down tube elements 165, 170 comprising the down tube 20.

Figure 16:
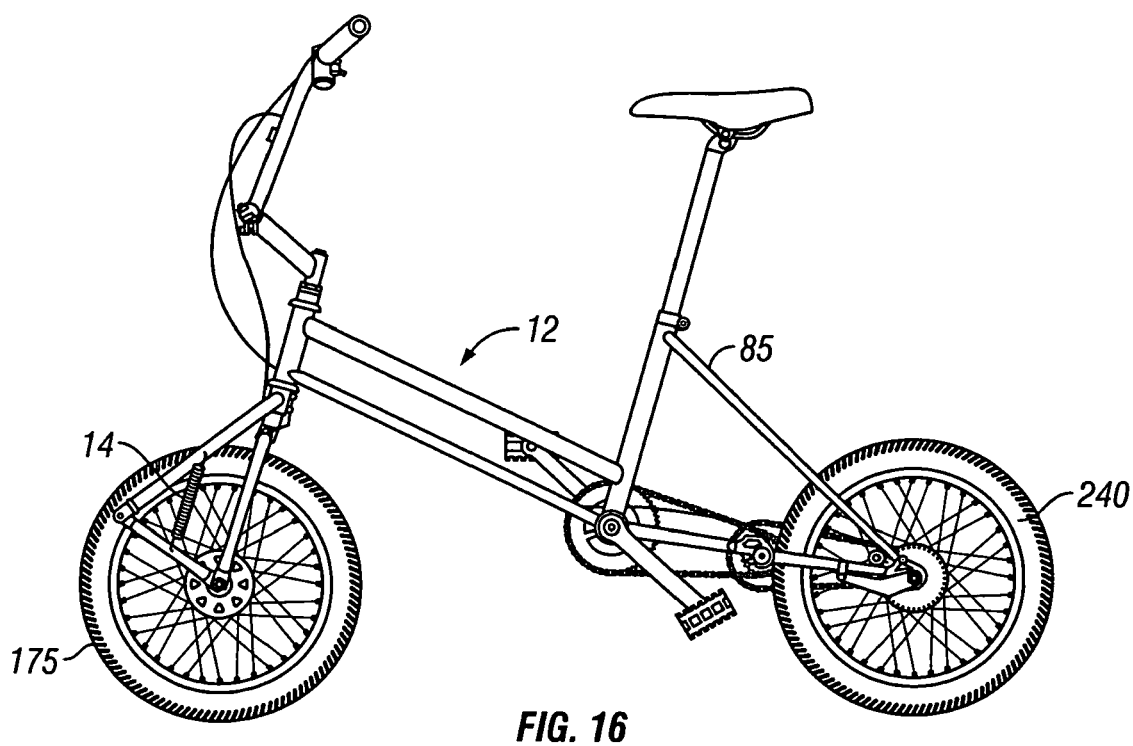
FIG. 16 is a side view of an embodiment of a foldable bicycle in accordance with the present invention.
Figure 17:
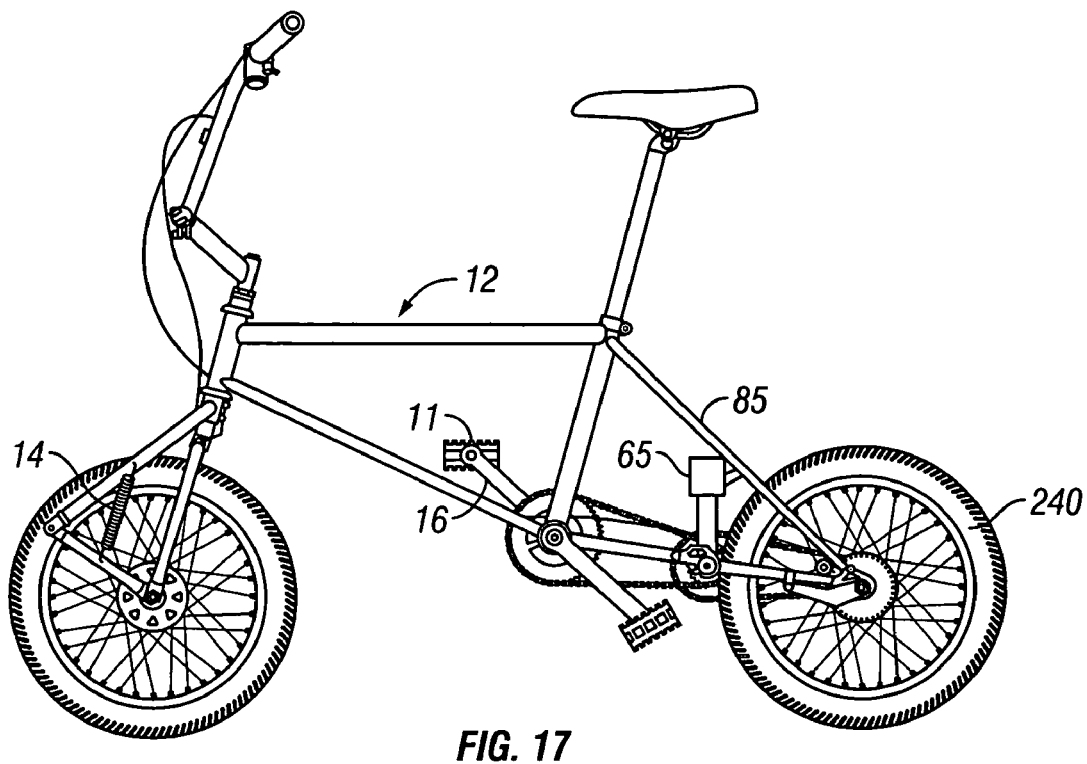
FIG. 17 is a side view of a motorized embodiment of a foldable bicycle, in accordance with the present invention.

An alternative embodiment front fork assembly 115 may include two springs or shock absorbers 14, as shown in FIGS. 15, 16, and 17, that are mounted between the front fork 150 and either the stirrup 160 and/or the swing arm 155. The two springs or shock absorbers 14 would secure the stirrup latch 180 in the closed position when the foldable bicycle 10 is configured in the riding mode. The springs or shock absorbers 14 may be of any type, such as an elastomer type, hydraulic or pneumatic. It will be appreciated that one, or more springs or shock absorbers 14 may be mounted anywhere within the front fork assembly 115, in any suitable location.

One feature of the foldable front fork assembly 115 is that the "head angle" of the bearing tube can be configured similar to the head angle of a non-folding bicycle. The head angle determines the front fork rake angle, which affects steering "quickness." That is, the steering of the present invention will feel normal to a rider accustomed to a non-folding bicycle, in contrast to conventional folding bicycles, that have a steeper head angle, which results in a steep front fork rake angle. This can be implemented to create relatively quick steering, resulting in a nervous, or edgy steering feel as desired.

Figure 9:
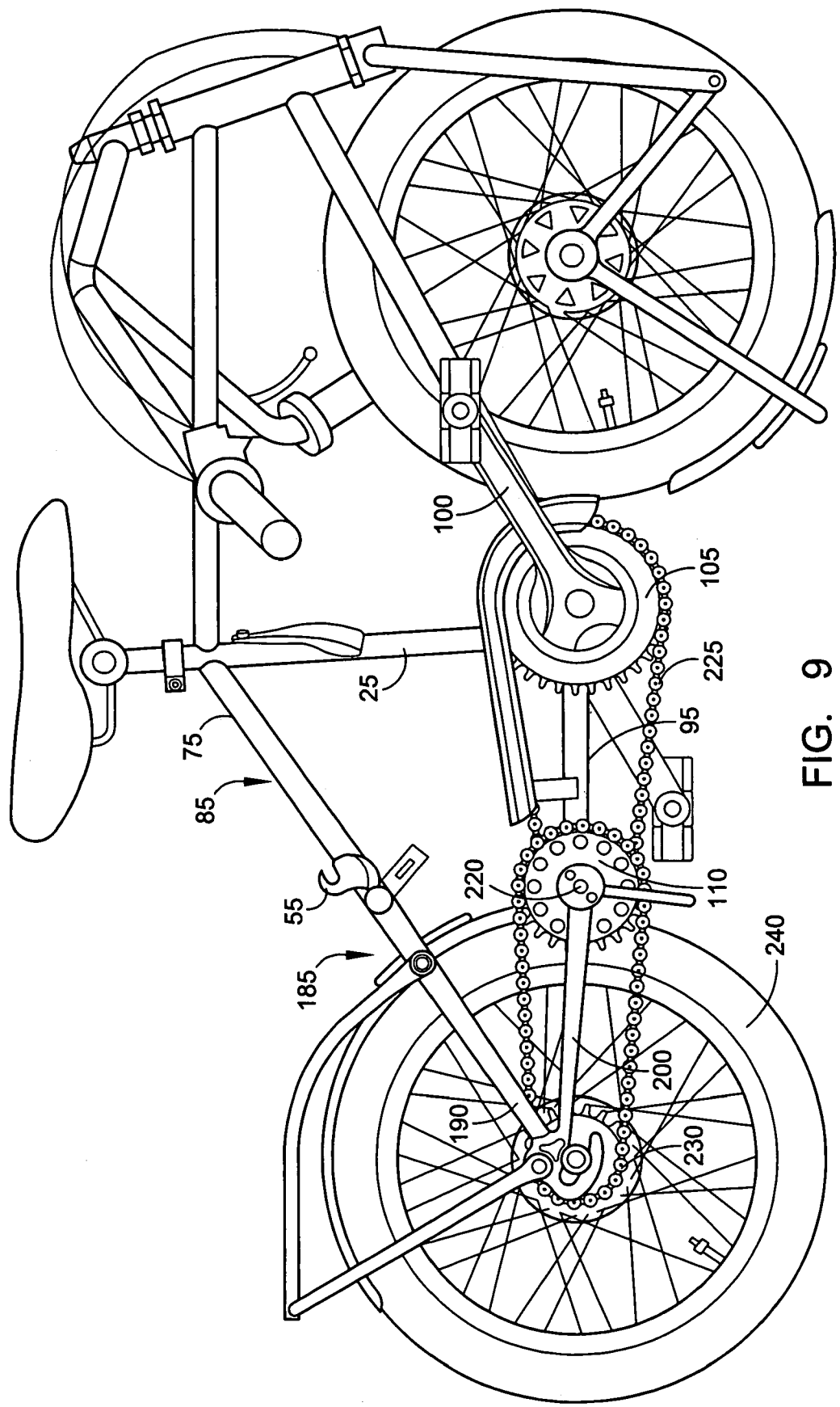
FIG. 9 is a detail view of the embodiment illustrated in FIG. 2, showing the foldable rear wheel assembly, in accordance with the present invention.
Figure 10:
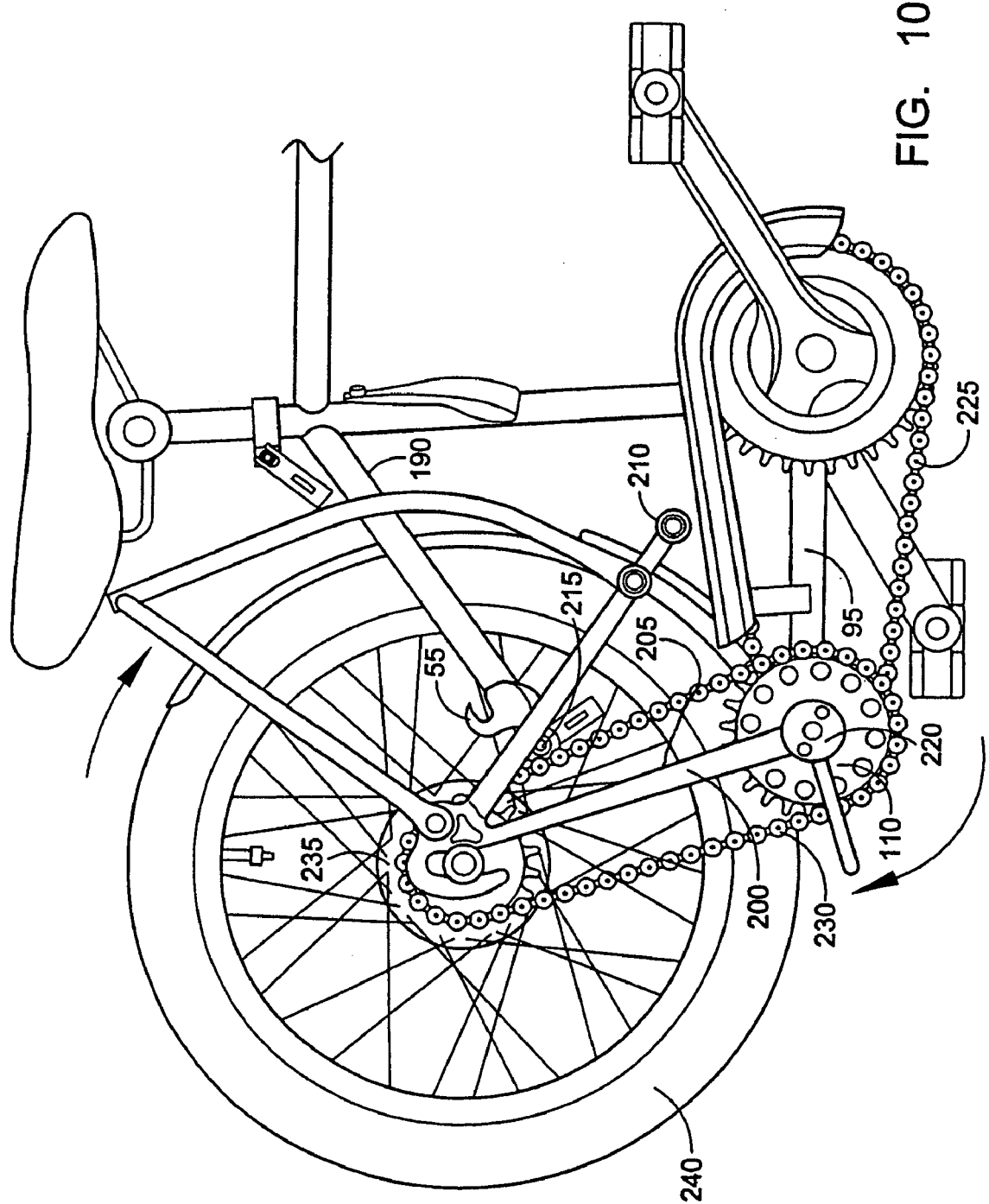
FIG. 10 is a detail view of the embodiment illustrated in FIG. 9, showing the rear wheel assembly in a partially-folded configuration, in accordance with the present invention.

An optional rear wheel assembly 120 also is provided. Any assembly may be used that is suitable for mounting the rear wheel rotatably with respect to the frame 12, and for mounting as desired one or more seat assemblies. In the illustrated embodiment, the seat stay is divided into an upper seat stay 85, and a lower seat stay 185. The upper seat stay 85 may optionally have two upper seat stay tubes 75, 80, shown in FIG. 3. The lower seat stay 185 optionally includes two lower seat stay tubes 190, 195, as shown in FIGS. 3, 9 and 10. Attached to the lower seat stay 185 is a seat stay fastener receiver 215, which is sized to receive the seat stay fastener 210. In this way the lower seat stay 185 is releaseably coupled to the upper seat stay 85. Preferably, the seat stay fastener 210 is a quick-release type, but other suitable fasteners, or latches may be employed. Also, the arrangement of fastener to receiver may be switched.

As shown in FIGS. 3, 9 and 10, one feature of the present invention is that the bottom bracket is divided into a forward bottom bracket comprising two forward bottom bracket tubes 90, 95 and a rear bottom bracket comprising two rear bottom bracket tubes 200, 205. The tubes are pivotally connected by pivot 220. Rotatably coupled about the pivot 220 is a middle sprocket assembly 110. The middle sprocket assembly 110 is connected to the front sprocket 105 by a front chain 225 which runs from front sprocket 105 to a first middle sprocket 112 on the middle sprocket assembly 110 (as depicted in FIGS. 11 and 12). The rear chain 230 connects a second middle sprocket 114 to the rear hub 235 that can contain one or more sprockets 237 providing differing gear ratios.

In a preferred tandem bicycle embodiment, the diameter of the first sprocket 105 is the same as that of the first middle sprocket 112 and the diameter of the second middle sprocket 114 is greater than that of one or more of the sprockets 237 on the rear hub 235, although any sprocket size can be used that allows the pedal force generated at any of the pedal assemblies 100, 107 to the rear wheel 240.

In one embodiment of the present invention, the rear hub 235 may contain internal gears, or the rear hub 235 may include external gears and a derailleur to move the chain between the gears. In addition, the front sprocket 105 may include additional sprockets beyond the two sprockets 112, 114 in the illustrations. In this way, a variety of gear ratios may be provided. One feature of the present invention is that the two sprocket assemblies 105, 110 provide a gear ratio that may be suitable for most bicycle speed requirements.

It should be noted that although chains 225 and 230 are discussed herein as providing mechanism for transmitting force between the respective sprockets 105, 110 and, or the hub mechanism 235 force can be transmitted via any mechanism that allows the forces to be appropriately transmitted from the rider's feet or hands to the appropriately driven wheel or wheels. For example, the force can be transmitted from pedals 100 or 107 via a drive shaft to rear wheel 240 or front wheel 175. Such a drive shaft system is widely known and used, for example in motorized vehicles to transmit propulsive force from an engine to one or more wheels. Alternatively, a power supply 65 may be included for providing a propulsive force. The power supply 65 may comprise an electric or internal combustion motor, that in a preferred embodiment would not increase the folded dimensions of the foldable bicycle 10, or the tandem foldable bicycle 70.

Again referring to FIGS. 3, 4 9 and 10, the method of folding the rear wheel assembly 120 will now be described. When the seat stay fastener 210 is uncoupled from the seat stay fastener receiver 215, the rear wheel 240 is rotated about pivot 220, toward the seat 35. The front chain 225 remains positioned between the front sprocket 105 and the middle sprocket 110, while the rear chain 230 remains positioned between the middle sprocket 110 and the rear hub 235. The two rear bottom bracket tubes 200, 205 shift upward with the rear wheel 240. This arrangement of components keeps the distance between the front sprocket 105 and the middle sprocket 110 substantially constant during the folding process, avoiding any slack in the respective chains 225, 230. Therefore, it is not possible for the chains 225, 230 to come off during the folding and unfolding of the foldable bicycle 10. An alternative embodiment of the present invention may employ drivebelts, preferably geared drivebelts, instead of chains.

As shown in FIG. 4, when fully folded, the rear wheel 240 is positioned adjacent to the seat 35. A locking device may be used to keep the rear wheel 240 in the folded position. This greatly decreases the size of the foldable bicycle 10, allowing it to be carried in a large bag, backpack, and easily stowed in a small vehicle.

In addition, to reduce the width of the foldable bicycle 10, or the tandem foldable bicycle 70, the pedals may also be folded. Moreover, the foldable bicycle 10, or the tandem foldable bicycle 70 may be equipped with an electric or internal combustion motor without increasing the folded dimensions.

Any size wheel diameter can be used that allow the wheels to be appropriately folded using the frame assembly 12 provided. For example, both the front wheel 175 and the rear wheel 240 can be 14 inches or 16 inches in diameter, but other wheel sizes may be employed, such as for example 23 inches in diameter or other sizes. In addition, the foldable bicycle 10 and the tandem foldable bicycle 70 may be equipped with brakes, lights, fenders, a kick stand, and other amenities. Moreover, the frame may be sized to fit a child, or an oversized adult, or the top tube 15 may be positioned closer to the down tube(s) 20, such as traditionally has been provided on female gender-specific bicycles, as shown in FIG. 16.

Figure 19:
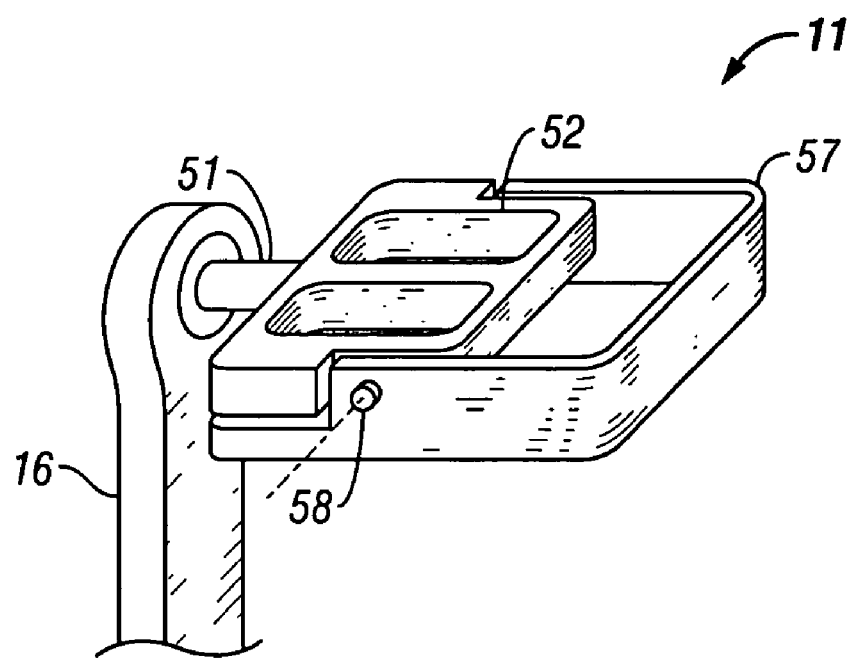
FIG. 19 is a perspective view of a pedal in accordance with the present invention.
Figure 20:
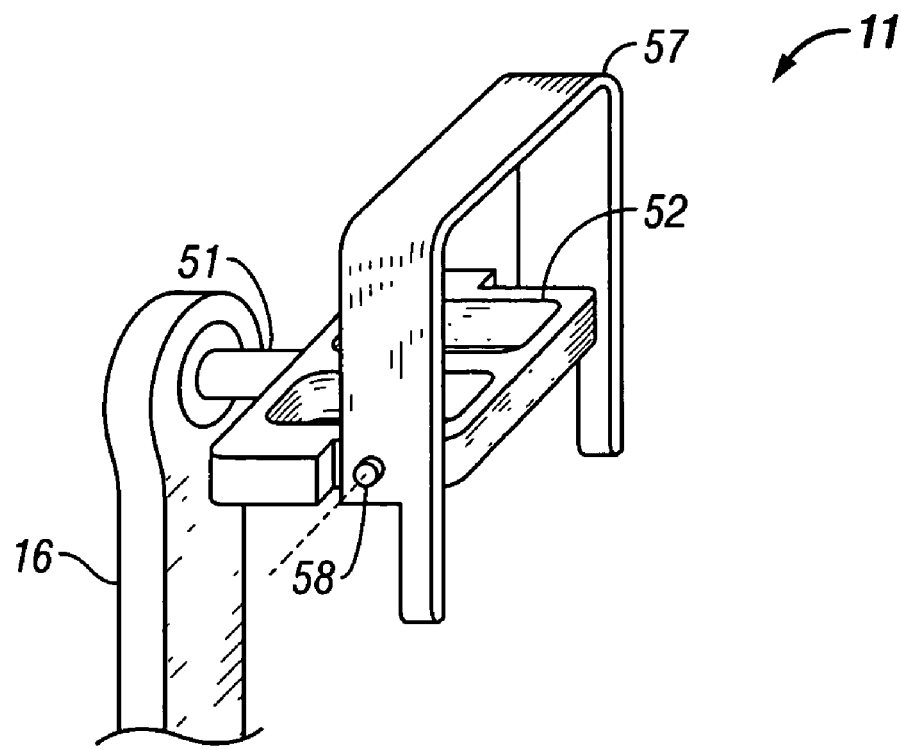
FIG. 20 is a perspective view of a pedal in accordance with the present invention.

Referring now to FIGS. 19-20, a foldable pedal assembly 111 is illustrated. Attached to pedal cranks 16 is a pedal mount 51. A narrow pedal member 52 is coupled to the pedal mount 51. It will be appreciated that either the narrow pedal member 52, or the pedal mount 51 may rotate about the pedal cranks 16. An outer footrest 57 is pivotally coupled about pedal pivot axis 58, and when in the folded position, as shown in FIG. 20, substantially decreases the width of the foldable pedal assembly 11. When in the unfolded position, as shown in FIG. 19, the outer footrest 57, in conjunction with the narrow pedal member 52, provides a substantial area for receiving an operator's foot.

Thus, it is seen that a foldable bicycle is provided. One skilled in the art will appreciate that the present invention can be practiced by other than the above-described embodiments, which are presented in this description for purposes of illustration and not of limitation. The description and examples set forth in this specification and associated drawings only set forth embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A folding bicycle, comprising:
   a frame including a downtube and a seat tube, wherein the seat tube is fixed relative to the downtube;
   a rear wheel assembly;
   a seat stay extending between the seat tube and the rear wheel assembly and comprising a coupling mechanism;
   a foldable front wheel assembly rotatably coupled to the frame; and
   at least one chain stay comprising a middle gear assembly that enables the rear wheel assembly to fold about the middle gear assembly in a direction toward the seat stay,
   wherein the down tube includes spatially separated down tubes that receive at least a portion of the front wheel assembly therebetween when the folding bicycle is in a folded position.

2. The bicycle of claim 1, wherein the seat stay coupling mechanism is selected from the group consisting of a latch, spring lock, hook-and-loop fastener, and a quick-release fastener.

3. The folding bicycle of claim 1, further comprising folding pedals that fold in a direction such that the folding pedals are parallel to the frame when the folding pedals are in a folded position.

4. The folding bicycle of claim 1, wherein the front wheel assembly includes:
   a front wheel fork;
   a swing arm pivotally coupled to the front wheel fork; and
   a stirrup removeably coupled to the front wheel fork, and fixedly attached to the swing arm.

5. The folding bicycle of claim 4, wherein the stirrup includes a coupling mechanism selected from the group consisting of a latch, spring lock, hook-and-loop fastener, and a quick-release fastener.

6. The folding bicycle of claim 1, wherein the front wheel assembly includes:
   a front wheel;
   a front wheel fork; and
   a swing arm pivotally coupled to the front wheel fork.

7. The folding bicycle of claim 1, further comprising a foldable handlebar assembly that is fixedly coupled to the front wheel assembly such that it is configured to rotate with the front wheel assembly relative to the frame, wherein the handlebar assembly is configured such that when the handlebars are in a folded position at least one of the handlebars is positioned partially beneath a top tube of the frame.

8. The folding bicycle of claim 1, further comprising a removable seat tube that is removeably coupled to the seat stay.

9. The folding bicycle of claim 8, further comprising at least one chain stay extending between the seat tube and the rear wheel assembly and the removable seat tube is removeably coupled to the chain stay.

10. A method of folding a foldable bicycle, the method comprising the steps of:
    rotating a front wheel fork to a rear-facing orientation, wherein at least one end of the front wheel fork member is rotatably mounted to a folding bicycle having a front wheel;
    releasing a stirrup; and
    pivoting the front wheel about a joint connecting a swing arm to the front wheel fork after the front wheel fork is rotated into the rear-facing orientation so that a portion of the wheel is positioned adjacent a bicycle down tube.

11. The method of claim 10, wherein the bicycle down tube comprises at least two tube segments, and the step of pivoting the front wheel comprises positioning at least a portion of the wheel between the two tube segments.

12. The method of claim 10, wherein the step of releasing the stirrup includes releasing a stirrup connector.

13. The method of claim 10, wherein the stirrup is released by uncoupling a latch.

14. The method of claim 10, further comprising folding a rear wheel relatively closer to a frame of the bicycle.

15. The method of claim 14, wherein folding the rear wheel comprises pivoting the rear wheel about an axis intermediate between the axis of rotation of the wheel and an axis of rotation of a pedal assembly of the bicycle.

* * * * *